Sept. 9, 1930.        E. L. A. SAVY        1,775,475
CHOCOLATE COATING APPARATUS
Filed June 14, 1926        2 Sheets-Sheet 1
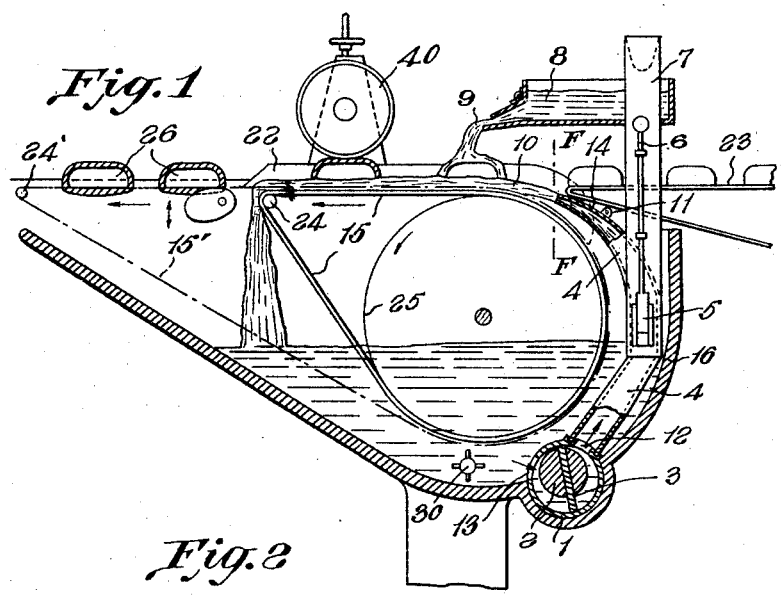
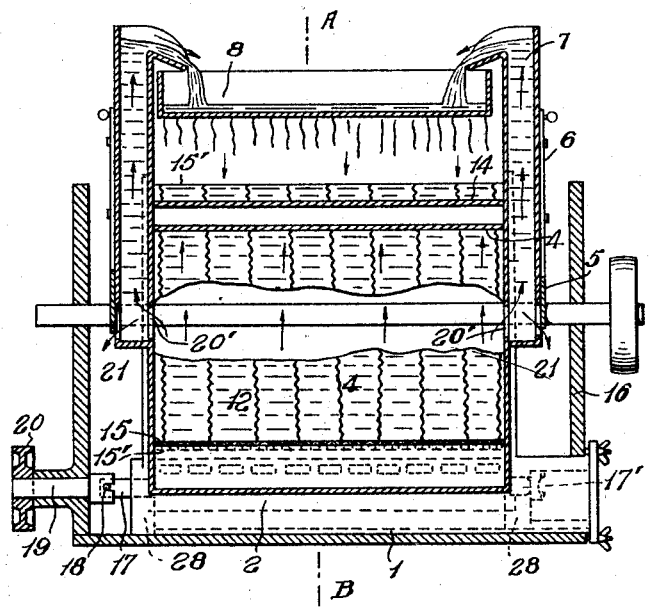
Inventor:
E. L. A. Savy
By Emil Bonnelycke
Attorney Sept. 9, 1930.     E. L. A. SAVY     1,775,475
CHOCOLATE COATING APPARATUS
Filed June 14, 1926    2 Sheets-Sheet 2
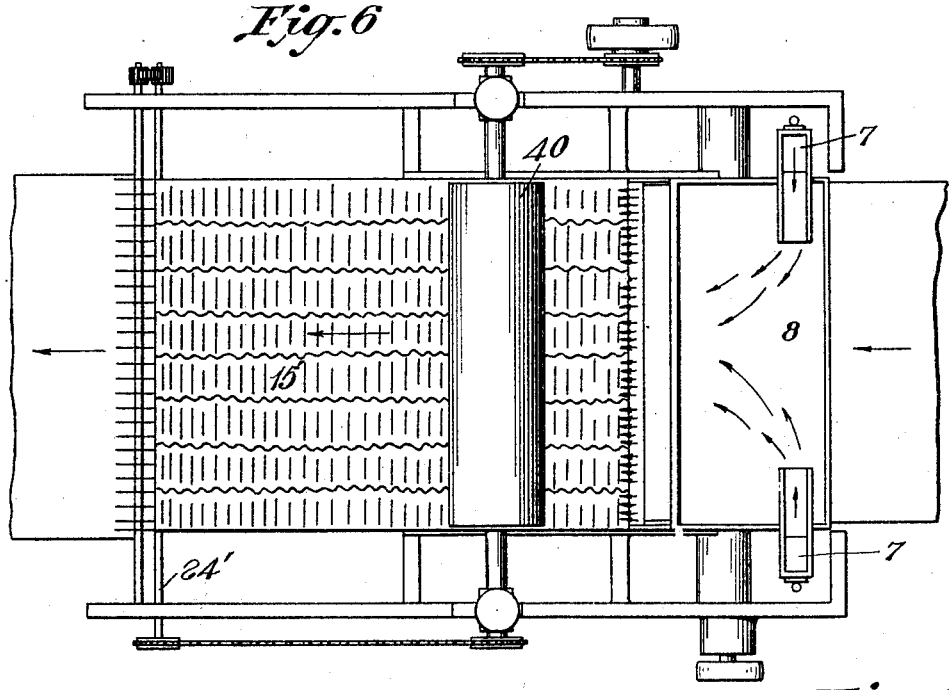
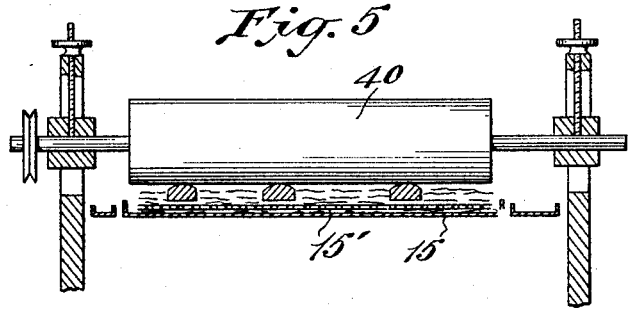
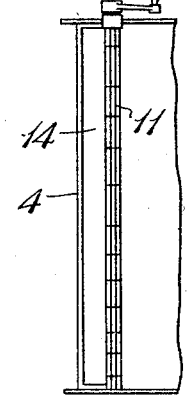
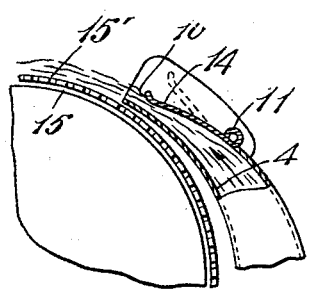
Inventor.
E.L.A. Savy
By Emil Bönnelycke
Attorney Patented Sept. 9, 1930

1,775,475

UNITED STATES PATENT OFFICE

EMILE LOUIS ALFRED SAVY, OF PARIS, FRANCE

CHOCOLATE-COATING APPARATUS

Application filed June 14, 1926, Serial No. 115,921, and in France June 19, 1925.

This invention relates to a pump adapted to work in conjunction with a machine for coating biscuit, confectionery and the like, and enabling chocolate or icing cream to be applied on either the upper portion or the bottom, or on both top and bottom of such articles.

A practical construction of this pump, in connection with a well-known type of coating machine, is shown by way of illustration in the accompanying drawings, Figure 1 of which is a longitudinal sectional view taken on line A—B of Fig. 2, which latter is a cross-section on line C—E—F—D of Fig. 1. Fig. 3 is a detail view in section and on a greatly enlarged scale, showing the shutter for controlling the discharge from the pump nozzle, and Fig. 4 is a fragmental plan view of the nozzle discharge. Fig. 5 is a transverse section showing the adjustable mounting of the roller that forces the articles to be coated into the sheet or stream of coating material, and Fig. 6 is a plan view of Fig. 1.

For clearness of explanation, the structural features of an existing coating apparatus are given hereafter.

This apparatus or machine is provided with a container or vessel 16 to receive the coating substance, and in said container a revolving horizontal drum 25 is placed equipped with suitable driving mechanism. This drum drives an endless belt 15 which passes directly around it and also passes over a spindle 24, said belt 15 itself being overlaid by and frictionally driving a second endless belt 15' that is made of woven metal strips or wires, passes over the spindle 24' and returns to the drum 25. A conveyor 23 above the drum 25 automatically delivers the various articles 26 to be coated upon the belts 15 and 15', the belt 15 being made of material which is impermeable to the coating substance.

The drum 25 and, hence, the two belts 15 and 15' travel through the chocolate, icing cream or other viscous or semi-liquid coating material in the vessel 16, so that a quantity of such material (hereinafter referred to simply as chocolate, for convenience) will adhere to the belts during their upward and leftward movement and until the spindle 24 is reached, whereupon it falls through the meshes of the openwork belt 15' back into the vessel. The bonbons 26 or other articles to be coated are delivered by the feed conveyor 23 to the upper part of the drum, as shown in Fig. 1, so that as they travel along the upper stretch of the belts the chocolate picked up by the belts will be applied to their bottoms.

In a machine of this type, good results may be obtained with hard or thick coating substances; but with soft or very liquid chocolate, the quantity picked up by the belts is too small; and to rectify this defect, the previously-mentioned pump is employed and serves to effect a uniform coating of the articles. In either case, however, a vertically adjustable roll 40 may be utilized to press the bonbons into the sheet or stream of chocolate on the belts to the proper depth so as to insure the application of the chocolate, the quantity of the latter being greatly increased, of course, by the stream delivered by the pump when used. Roll 40, as will be understood, is disposed transversely of the belts and at a slight distance above the same.

The aforesaid pump is placed in the vessel 16 below the drum 25, and it comprises a metal tube or casing 1 provided with a removable cap 28 at each end for cleaning purposes. In said casing is located a shaft 2, the central part of which is of greater diameter than the two end parts 17 and 17', which latter project through the two caps 28; one end 17 carrying a pin 18 that engages a groove in the main shaft 19 driven by a pulley 20 or in any other suitable way.

The shaft 2 has its central portion slotted to receive a thin iron plate or slide 3, the width of which is nearly equal to the diameter of the tube 1 (see Fig. 1). It will be observed that the shaft 2 and the tubular casing 1 are eccentrically related, and that they are in contact at the upper part of the casing; due to which arrangement the device works, when in motion, like an ordinary rotating piston.

The tube or casing 1 has formed in it two sets of openings or ports 12 and 13, the ports 13 being provided to admit the chocolate into the pump while the ports 12 deliver it directly into a nozzle 4 that extends the entire length of the casing 1 and encloses the ports 12. An adjustable shutter 14 (best shown in Figs. 3 and 4) is hinged or pivoted at 11 to the side walls of the nozzle adjacent the outlet 10 thereof and can be raised or lowered by a crank handle 11' to regulate said outlet at will. Two vertical pipes or conduits 7, one at each side of nozzle 4, are also provided; said nozzle being further provided with openings 20' to allow the chocolate to flow into the interior of these conduits. Additional openings 21 are formed in the lower part of the inner walls of the conduits to discharge the chocolate from the latter back into container 16, and are opened or closed by means of adjustable slides 5 operated by rods 6.

To receive the two streams of chocolate pumped through the conduits 7, a collecting vessel or container 8 is provided which serves as a guide for the chocolate as it is discharged through the adjustable spout 9. Flanges 22 are utilized for guiding this descending stream over the belts 15 and 15', and a beater or agitator 30 is arranged in the bottom of the container 16 to keep the chocolate in motion.

In operation, the pump will enable the chocolate, icing or other suitable material of like character to be applied either on the lower part only, or on the top only, or on both top and bottom of the articles to be coated, this result being obtained by means of the above-described pump and vertical side conduits 7. By properly adjusting the slides 5 and the opening 10 of the nozzle 4— the latter adjustment being effected by moving shutter 14 about its hinge or pivot 11—a regular stream of chocolate will be permitted to flow over the entire width of the conveyor 15 regardless of the extent thereof, so that the bottoms of the articles will thus be coated.

By closing the slides 5, but without changing the opening 10, the surplus material discharged by the pump, being unable to escape into the reservoir 16 through the openings 21 controlled by said slides, will rise in the conduits 7 and flow into the vessel 8, whence it is discharged through spout 9 in a stream that likewise extends entirely across the belt. This stream falls upon the tops of the articles and meets the horizontal stream flowing along the belts, thus completing the coating of the articles which are covered all over.

If both the slides 5 and the opening 10 are closed, there will be a single stream only, which will be discharged from the spout 9, in which event the upper portions alone of the articles will be coated.

The pump described above will discharge streams of fluid of any different widths and may, therefore, be used for other purposes and in different machines than those set forth herein.

I claim as my invention:—

1. A coating machine, comprising a receptacle to contain liquid or semi-liquid coating material; a conveyor for the articles to be coated movable across said receptacle; a pump in said receptacle in free communication with the coating material; a nozzle connected to said pump to discharge said material upon said conveyor to coat the bottoms of the articles; valve means for controlling the outlet of the nozzle; an elevated device for discharging coating material upon the tops of the articles upon the conveyor; conducting means leading from the nozzle to said device; and valve means for controlling the passage of the coating material through said conducting means.

2. A coating machine, comprising a receptacle to contain liquid or semi-liquid coating material; a conveyor for carrying thereacross the articles to be coated; a pump in said receptacle in free communication with the contents thereof; a discharge passage leading from said pump; a device at the outlet end of said passage for coating the bottoms of the articles on the conveyor; an elevated device for coating the tops of the articles; vertical conducting means leading from said passage to the elevated device; and means for controlling the flow of coating material to said conducting means.

3. A coating machine, comprising a receptacle to contain liquid or semi-liquid coating material; a conveyor for carrying thereacross the articles to be coated; a pump in said receptacle in free communication with the contents thereof; a discharge passage leading from said pump; a device at the outlet end of said passage for coating the bottoms of the articles on the conveyor; an elevated device for coating the tops of the articles; vertical conducting means leading from said passage to the elevated device and provided adjacent the lower end thereof with port means opening into the receptacle; and means for opening or closing said port means to control the flow of coating material through said conducting means.

4. A coating machine, comprising a receptacle to contain liquid or semi-liquid coating material; a conveyor for carrying thereacross the articles to be coated; a pump in said receptacle in free communication with the contents thereof; a discharge passage leading from said pump; a device at the outlet end of said passage for coating the bottoms of the articles on the conveyor; an elevated device for coating the tops of the articles; a pair of vertical conduits, one at each side of said passage, leading from the same to the elevated device; and means for controlling the flow of coating material through said conduits.

5. A coating machine, comprising a receptacle to contain liquid or semi-liquid coating material; a conveyor for carrying thereacross the articles to be coated; a pump in said receptacle in free communication with the contents thereof; a discharge passage leading from said pump; a device at the outlet end of said passage for coating the bottoms of the articles on the conveyor; an elevated device for coating the tops of the articles; a pair of vertical conduits, one at each side of said passage, leading from the same to the elevated device and provided adjacent their lower ends with ports that open into the receptacle; and means for opening and closing said ports to control the flow of coating material through said conduits.

6. A coating machine, comprising a receptacle to contain liquid or semi-liquid coating material; a conveyor extending the full width of the receptacle for carrying the articles to be coated across said receptacle; and a pump in said receptacle having an operating element which likewise extends the entire width of the receptacle and which acts to discharge a stream of material upon the conveyor for coating the bottoms of the articles, such stream also having the full width of the receptacle.

7. In a coating machine, a receptacle to contain liquid or semi-liquid coating material; a carrier for the articles to be coated during the coating operation extending the full width of the receptacle; and a pump having an operating element which likewise exends the entire width of the receptacle and which acts to discharge a stream of coating material of uniform depth over the full width of the carrier and, hence, upon all said articles.

In testimony whereof I affix my signature.

EMILE LOUIS ALFRED SAVY.